(12) United States Patent
Lochocki, Jr. et al.

(10) Patent No.: US 8,972,128 B2
(45) Date of Patent: Mar. 3, 2015

(54) TRANSMISSION WITH CREEP CONTROL INTERVENTION FUNCTIONALITY

(71) Applicant: GM Global Technology Operations LLC, Detroit, MI (US)

(72) Inventors: Ronald F. Lochocki, Jr., Ypsilanti, MI (US); Brian Hanselman, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/951,931

(22) Filed: Jul. 26, 2013

(65) Prior Publication Data

US 2015/0032343 A1    Jan. 29, 2015

(51) Int. Cl.
*B60W 10/02*    (2006.01)
*B60W 10/06*    (2006.01)
*B60W 10/196*    (2012.01)
*B60W 10/10*    (2012.01)

(52) U.S. Cl.
CPC ............. *B60W 10/196* (2013.01); *B60W 10/10* (2013.01); *B60W 2510/18* (2013.01)
USPC .............................................. 701/53; 701/67

(58) Field of Classification Search
USPC ................... 701/53, 54, 58, 67; 477/173, 180
See application file for complete search history.

(56) References Cited

U.S. PATENT DOCUMENTS

| | | | | |
|---|---|---|---|---|
| 7,512,474 B2* | 3/2009 | Tabata et al. | ..................... | 701/91 |
| 2008/0319619 A1* | 12/2008 | Terayama | ........................ | 701/54 |
| 2009/0114468 A1* | 5/2009 | Schwarz et al. | .............. | 180/338 |
| 2013/0304336 A1* | 11/2013 | Jackson | .......................... | 701/53 |

* cited by examiner

*Primary Examiner* — Edwin A Young
(74) *Attorney, Agent, or Firm* — Quinn Law Group, PLLC

(57) ABSTRACT

A vehicle includes a brake pedal, engine, transmission, and controller. The transmission includes an input member and an input clutch responsive to position control signals. The controller has multiple control modules, each outputting a corresponding torque command. One module is a creep control module which outputs a calibrated creep torque. Intervention logic independently monitors the torque commands during a creep maneuver, with control actions executed when predetermined conditions are present. The torque command from the creep controller determines the position control signals of the input clutch during the creep maneuver, and creep torque is set to zero whenever the brake pedal is sufficiently applied. A transmission assembly includes the input member, input clutch, and controller. A method includes outputting torque commands from each control module, including the creep torque, monitoring the torque commands during the creep maneuver, and executing the control actions when the predetermined conditions are present.

20 Claims, 3 Drawing Sheets

| $B_X$ | $N_{10}$ | ~ 5 | ~ 1 | ~ .15 | ~ .1 | 0 |
|---|---|---|---|---|---|---|
| 0 | | 1 | 1 | 1 | 1 | 1 |
| ~ 5 | | 1 | 1 | 1 | 1 | 1 |
| ~ 5.1 | | 1 | 1 | 1 | 1 | 1 |
| ~ 40 | | 1 | 1 | 1 | 1 | 1 |
| ~ 40.1 | | 1 | 1 | 1 | 0 | 0 |
| 100 | | 1 | 1 | 1 | 0 | 0 |

US 8,972,128 B2

TRANSMISSION WITH CREEP CONTROL INTERVENTION FUNCTIONALITY

TECHNICAL FIELD

This disclosure relates to a transmission having creep control intervention functionality.

BACKGROUND

A dual clutch transmission (DCT) combines features of manual and automatic transmissions. For example, a DCT has two input clutches and different oddly-numbered and evenly-numbered gear sets. The input clutches are separately applied to respectively engage the oddly-numbered gear and evenly-numbered gear sets. A controller predicts the next-selected gear using various control inputs such as engine acceleration, vehicle speed, and braking levels, and then commands a staging of the next gear ahead of the impending shift. Relative to an automatic transmission, such staging in advance of the shift can result in faster gear shift speeds, with the DCT design typically providing excellent shift control and power. An automated manual transmission (AMT) is similar in structure to a DCT but has only one input clutch.

In transmission control parlance, the term "creep control" refers to the enforcement of a low level of permitted engine torque at zero throttle. For example, when a driver removes all pressure from a brake pedal while the engine is idling, the vehicle will begin to move or "creep" at a low rate of speed until the driver depresses an accelerator pedal to request additional engine torque. In order to creep in a vehicle having a DCT or an AMT, the input clutch is automatically applied while the engine idles. Regulation of the clutch torque command to the input clutch thus controls the creep torque up to its calibrated maximum allowable level.

SUMMARY

A vehicle is disclosed herein having an internal combustion engine, a transmission including an input member and one or more input clutches, and a controller. The controller includes various individual control hardware/software modules, including a creep control module. Each control module generates a potentially competing torque command. Therefore, the controller is operable to arbitrate between the various commands during a creep maneuver in selecting a particular one of them to apply. The torque commands are ultimately translated into clutch position commands, e.g., with reference to a torque-to-position table as is known in the art.

Transient signal or processing errors could result in temporary but still unexpected arbitration results. Therefore, the controller set forth herein is also equipped with creep control intervention logic. This logic helps to ensure that clutch torque to the input clutch is not applied when the vehicle is stopped with its brakes fully applied, that vehicle speed is always limited in creep mode regardless of any errantly competing torque commands, and that torque application does not result in a threshold acceleration event.

All of these results are expected outcomes of a properly functioning torque arbitration process in a dual clutch transmission (DCT) or an automated manual transmission (AMT). However, as noted above, transient signal errors, electrical noise, or other unexpected hardware issues could conceivably occur to produce unexpected arbitration results. The presently disclosed intervention logic is thus intended to operate as an independent auditing mechanism for the underlying arbitration process, providing a consistent default creep and subsequent launch operation.

The controller monitors key driver input parameters to ascertain whether the vehicle should be operating in creep mode. If so, the controller ensures that no other control module, such as a launch control module, provides a torque command that is ultimately used to control the position of the input clutch. The other control modules are prevented from doing so as set forth herein, e.g., by application of calibrated speed or braking level-based gains.

In particular, a vehicle in one embodiment includes a brake pedal, an engine having a crankshaft, a transmission, and a controller, e.g., a transmission controller. The transmission has an input member and an input clutch that is responsive to position control signals. Engagement of the input clutch connects the crankshaft to the input member. The controller includes multiple control modules, each of which outputs a corresponding torque command. The multiple control modules include a creep controller programmed to output a calibrated creep torque.

The controller includes a processor and tangible, non-transitory memory on which is recorded intervention logic for independently monitoring the corresponding torque commands from each of the multiple control modules during a creep maneuver. The controller is also programmed to execute a set of control actions whenever predetermined conditions are present, including allowing only the torque command from the creep controller to determine the position control signals of the input clutch during the creep maneuver and setting the creep torque to zero whenever the brake pedal is sufficiently applied, i.e., applied with at least a threshold amount of pedal travel or force. For example, the controller may fully suppress the creep torque to zero when the brake pedal is applied above about 40% travel and vehicle speed is below 0.1 KPH or some other low fixed threshold.

A launch control module may be included that is operable to output a launch torque ($T_L$). The set of control actions then includes limiting a rate of increase in the launch torque when the vehicle is exiting from the creep maneuver. Limiting the rate of increase in the launch torque in this instance includes limiting an acceleration of the vehicle, e.g., to less than 0.3 G in 0.3 ms, or to any other desired acceleration threshold. The same control actions may include limiting a maximum speed of the vehicle via application of a clutch gain to the clutch torque while in creep mode, for instance by applying a clutch gain of 0 whenever the vehicle speed is about to exceed 7 KPH or some other desired threshold speed.

The controller may be programmed to determine if the vehicle is actively launching by comparing values such as braking levels, vehicle speed, and throttle request to calibrated thresholds, with all of these values forming the predetermined conditions noted above.

A transmission assembly is also disclosed herein that includes the input member, the input clutch, and the controller described above.

A method is also disclosed of independently monitoring, during a creep maneuver, the corresponding torque commands from the control modules of the vehicle noted above. The method includes outputting a corresponding torque command from each of the control modules, including outputting a calibrated creep torque from a creep controller. The method also includes monitoring the corresponding torque commands from each of the multiple control modules during a creep maneuver, and executing a set of control actions when predetermined conditions are present. These control actions include allowing only the torque command from the creep controller to determine the position control signals of the input clutch during the creep maneuver and setting the creep torque to zero when the brake pedal is applied.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
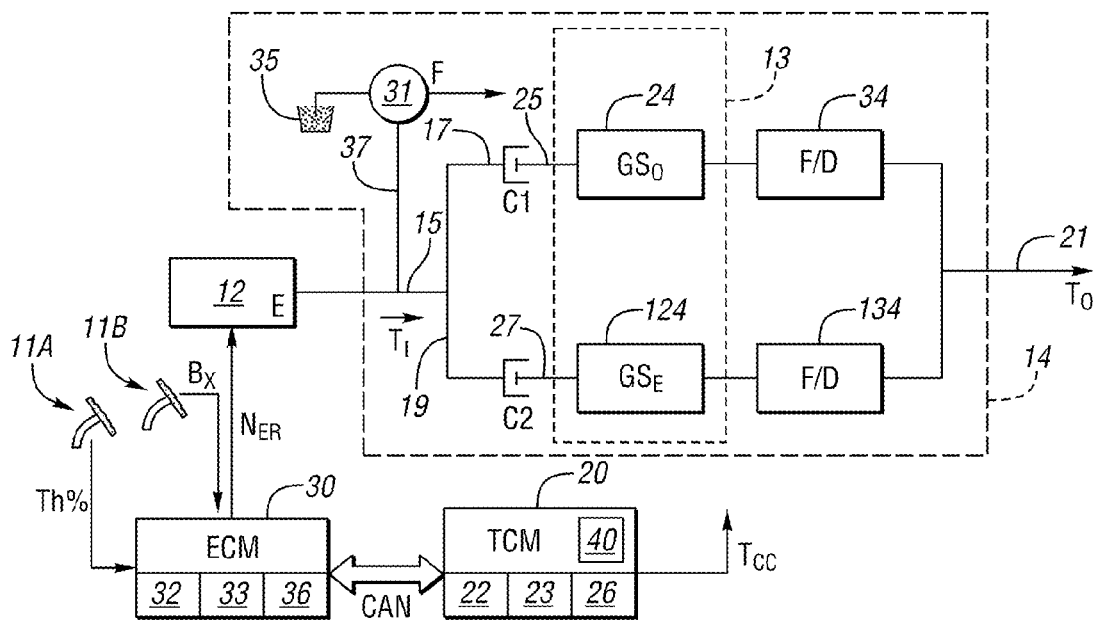
FIG. 1 is a schematic illustration of a vehicle having an example dual clutch transmission (DCT) and a controller which monitors a creep operation of the vehicle using torque arbitration logic and associated creep control intervention logic.

Referring to the drawings, wherein like reference numbers refer to like components throughout the several Figures, an example vehicle 10 is shown schematically in FIG. 1. The vehicle 10 includes an internal combustion engine 12 and a transmission 14, which is shown in one possible embodiment as an example dual clutch transmission (DCT) having a pair of input clutches C1 and C2. Alternatively, the transmission 14 may be configured as an automated manual transmission (AMT) having only one of the input clutches C1 or C2. For illustrative consistency, the DCT example will be used hereinafter.

The vehicle 10 of FIG. 1 includes a controller, e.g., a transmission control module (TCM) 20 as shown, and an engine control module (ECM) 30. The TCM 20 and the ECM 30 communicate with each other over a controller area network (CAN) bus or other suitable network path. In turn, the TCM 20 may include various control modules each executing its own corresponding functions, and each generating a corresponding torque command. These control modules are shown schematically in FIG. 2 as control modules 20X, some or all of which may be housed or located within the TCM 20, although any other number of control modules may be envisioned without departing from the intended inventive scope.

The TCM 20 of FIG. 1 is configured to monitor the ongoing creep control operation of the vehicle 10 using a set of creep control intervention logic 40. An example of the intervention logic 40 is described below with reference to FIG. 2. Relative to conventional creep control monitoring approaches, the TCM 20 of FIG. 1, via the intervention logic 40, independently audits the ongoing creep control operation and ensures that the creep operation always functions as expected, even in the face of unexpected transient software errors and the like. This independent auditing function is described in further detail below with reference to FIGS. 2-5. The TCM 20 ultimately outputs a commanded torque ($T_{CC}$) to the transmission 14 using the intervention logic 40, either as one of the many possibly competing torque commands from the control modules 20X or as an overriding torque command, depending on the evaluated circumstances as described below.

With respect to the example vehicle 10 of FIG. 1, the engine 12 is responsive to a received throttle request (arrow Th %). The throttle request (arrow Th %) may be commanded by a driver of the vehicle 10 as a force and/or a percentage of travel of an accelerator pedal 11A to indicate a relative level of requested engine torque. Such force/travel may be detected via a throttle sensor (not shown) in the conventional manner. In response to receipt of the throttle request (arrow Th %) by the ECM 30, the engine 12 delivers input torque (arrow $T_I$) to an engine crankshaft 15, with the input torque (arrow $T_I$) ultimately transmitted to the transmission 14. Similar force/travel of a brake pedal 11B may be captured as a braking signal (arrow $B_X$) and input to the ECM 30, and ultimately to the TCM 20, for use in creep control of the vehicle 10, as a release of the brake pedal 11B may signal the start of the creep maneuver.

As is well understood in the art, a DCT of the type shown in FIG. 1 includes a gearbox 13 containing two independently-operated input clutches, i.e., the respective first and second input clutches C1 and C2. While omitted from FIG. 1 for illustrative simplicity, each input clutch C1 and C2 may include a center plate containing any number of friction discs, friction plates, or other suitable friction materials. The input clutches C1 and C2 may be lubricated/wet or dry. If they are lubricated, fluid (arrow F) may be circulated by an engine-driven fluid pump 31 to the input clutches C1, C2, or the fluid (arrow F) may be circulated only to the gearbox 13 in a dry DCT embodiment. Associated electronic and hydraulic clutch control devices (not shown) ultimately control the shift operation and vehicle launch in response to instructions from various onboard controllers as explained in detail below.

In the example transmission 14 of FIG. 1, the first input clutch C1 controls the oddly numbered gear sets 24 ($GS_O$) of the DCT assembly 14, for instance first, third, fifth, and seventh gears in an example 7-speed transmission, while the second input clutch C2 controls any evenly numbered gear sets 124 ($GS_E$), e.g., second, fourth, and sixth in the same example 7-speed transmission. Within each of the gear sets 24, 124, additional clutches, typically hydraulic piston-actuated rotating or braking clutches, may be engaged or disengaged as needed to establish the desired gear states. The reverse gear state may be part of the oddly numbered gear set 24 and controlled via the first input clutch C1. Using this type of gear arrangement, the transmission 14 can be rapidly shifted through its available range of gears without completely interrupting the power flow from the engine 12.

The transmission 14 also includes an output shaft 21 that is connected to a set of drive wheels (not shown). The output shaft 21 ultimately transmits transmission output torque (arrow $T_O$) to the drive wheels to propel the vehicle 10. The transmission 14 may include an input member in the form of a first shaft 25 connected to the first input clutch C1, and a second shaft 27 connected to the second input clutch C2. The respective odd and even gear sets 24, 124 ($GS_O$, $GS_E$) are located within the gearbox 13, both of which may be cooled and lubricated via circulation of transmission fluid from a sump 35 via an engine-driven main pump 31, e.g., via a pump shaft 37, or alternatively via an auxiliary pump (not shown). A transmission assembly thus included the input member, i.e., shafts 25 and 27 or a single input shaft in the example of an AMT, the input clutches C1 or C2, or both, and the controller, specifically the TCM 20 in the examples set forth herein.

Within the transmission 14, the first shaft 25 is connected to and drives only the odd gear sets 24 ($GS_O$). The second shaft 27 is connected to and drives only the even gear sets 124 (GSE), including a reverse gear set. The transmission 14, when constructed as a DCT in the manner shown in FIG. 1, further includes upper and lower main shafts 17 and 19, respectively, which are connected to final drive (F/D) gear sets 34, 134. The final drive gear sets 34 and 134 in turn are connected to the output shaft 21 of the transmission 14, and are configured to provide any required final gear reduction.

Still referring to FIG. 1, the TCM 20 and the ECM 30 may be configured as microprocessor-based computer devices having associated hardware elements such as processors 22, 32 and memory 23, 33. The memory 22, 33 may include, but is not necessarily limited to, tangible, non-transitory computer-readable media such as read only memory (ROM), optical memory, solid state flash memory, and the like, as well as random access memory (RAM), electrically-erasable programmable read-only memory (EEPROM), flash memory, etc. The TCM 20 and the ECM 30 may also include circuitry including but not limited to a high-speed clock, analog-to-digital (A/D) circuitry, digital-to-analog (D/A) circuitry, a digital signal processor or DSP, transceivers 26, 36, and the necessary input/output (I/O) devices and other signal conditioning and/or buffer circuitry needed for executing the intervention logic 40, which will now be described with reference to the remaining Figures.

Figure 2:
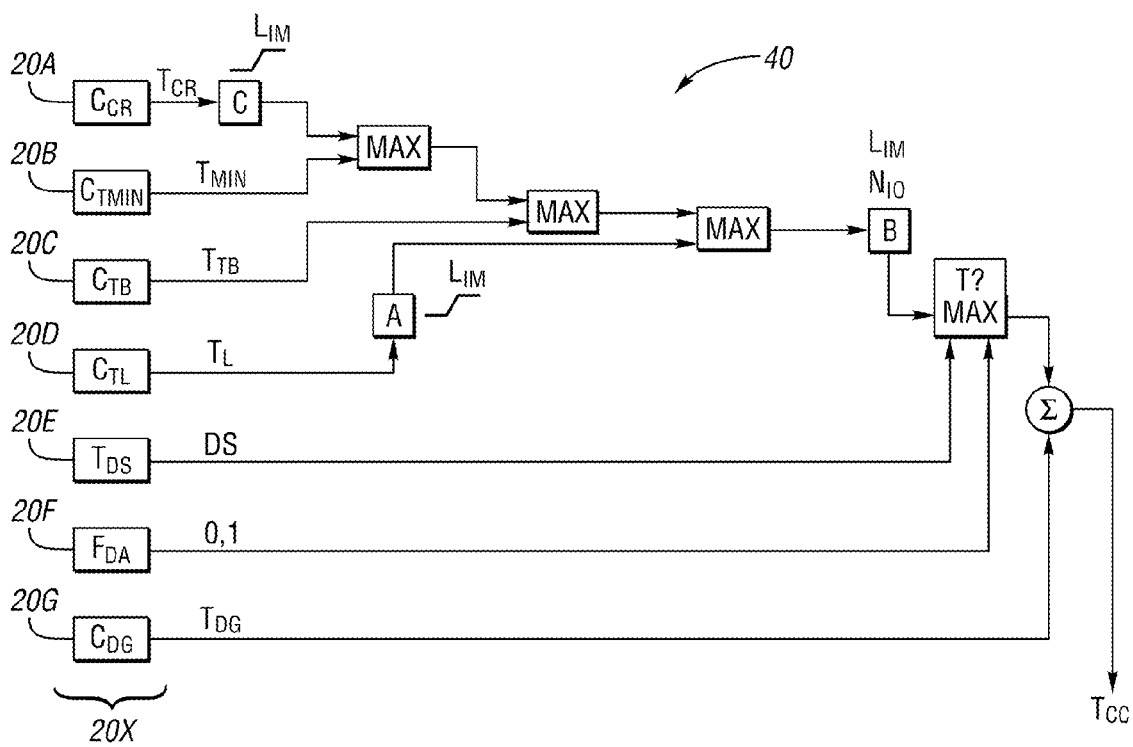
FIG. 2 is a flow diagram of example torque arbitration logic that is usable with the vehicle shown in FIG. 1.

Referring to FIG. 2, a logic flow diagram is shown to schematically illustrate an embodiment of the creep control intervention logic 40. The TCM 20 shown in FIG. 1, or another suitably configured controller(s), may include multiple control modules 20X, i.e., hardware and software computer devices each programmed or otherwise configured as needed to execute a specific control function. Example control modules 20A-G are shown as separate devices. However, some of the hardware of the control modules 20A-G may be shared between the control modules 20X.

Of the example control modules 20X shown in FIG. 2, a creep control module 20A, labeled as $C_{CR}$, has overall responsibility for commanding a creep torque ($T_{CR}$). The value of the creep torque ($T_{CR}$) may be calibrated and stored in memory 32 of FIG. 1. The creep control module 20A monitors key driver input parameters such as vehicle speed, throttle request, braking levels, gear state, shift state, and engine 12 running state, with respect to calibrated thresholds to ascertain whether the vehicle 10 of FIG. 1 should be operating in creep mode.

Other control modules 20X may include a minimum torque control module 20B, which continuously outputs a minimum transmission input torque ($T_{MIN}$) that is less than the creep torque ($T_{CR}$), and a tooth butt control module 20C that provides a calibrated tooth butt torque ($T_{TB}$). The tooth butt torque, as is known in the art, may be an oscillatory command which moves the engaging teeth or splines of any interfacing sun, ring, pinion, or carrier gear elements into proper engagement. A launch clutch control module 20D provides a calibrated launch torque ($T_L$) needed for launching the vehicle 10.

Additional control modules 20X may include a differential score protection module 20E, i.e., a module which provides a differential score torque ($T_{DS}$) under some conditions, such as a relatively high throttle request while the drive wheels are spinning Such a torque is intended to protect the differential (not shown). As part of such function, a differential active flag generator module 20F may be used to output a bit flag of 1 when the differential is active and 0 when inactive. One or more additional controllers 20G, e.g., a deglaze control module which applies a torque at specified times during creep or launch to remove glazed residue from the clutch, may output other potentially competing torque commands during creep or launch.

The TCM 20 of FIG. 1 is configured to arbitrate, via execution of code or instructions embodying the intervention logic 40 of FIG. 2, between all of the potentially competing torque commands from the various control modules 20X, while at the same time monitoring the overall torque arbitration process. The TCM 20 can then intervene as necessary whenever unexpected results occur during the creep operation. That is, in order to prevent unexpected or undesired torque commands from affecting closed-loop position control of the input clutches C1 and C2 in the vehicle 10 of FIG. 1 during a creep maneuver, the intervention logic 40 of FIG. 2 is provided with control nodes A, B, and C, which collectively perform a number of operations within the overall torque arbitration process to ultimately limit vehicle speed and acceleration during the creep maneuver, as well as preventing torque application when the brakes are applied and the vehicle 10 is stopped.

Figures 3, 4:
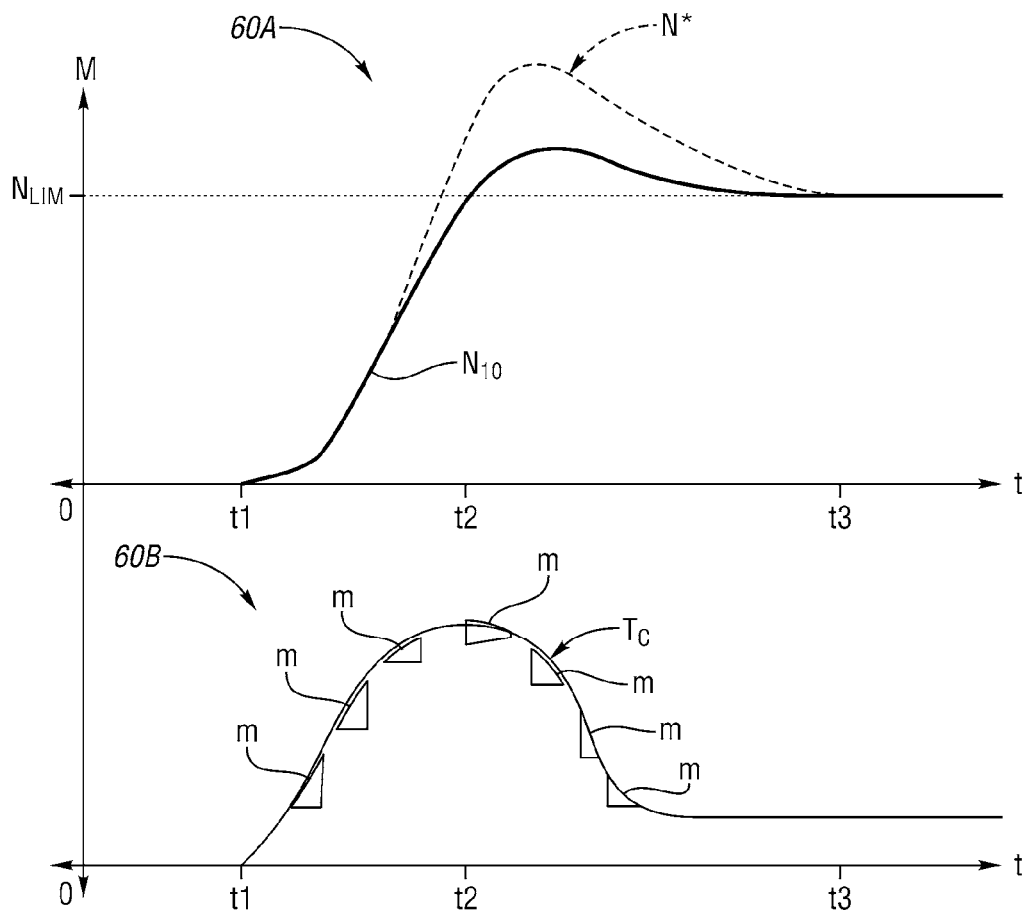
FIG. 3 is table describing possible braking levels and vehicle speeds that may be used in conjunction with the torque arbitration logic shown in FIG. 2.
FIG. 4 is a set of vehicle performance traces describing example vehicle speed and clutch torque limits usable in a possible embodiment with the torque arbitration logic of FIG. 2.

The operations of control nodes A-C include: (1) independently rationalizing the overall creep decision at various points of the torque arbitration process; (2) ensuring that whenever the brake pedal 11B of FIG. 1 is applied at a sufficient level, e.g., above 20% travel or force, during a positive throttle request, the creep torque ($T_{CR}$) from the creep control module 20A is always kept at zero. Other competing torques such as the tooth butt torque ($T_{TB}$), the differential score torque ($T_{DS}$), and the deglazing torque ($T_{DG}$) or any other torque commands not shown in FIG. 2 are permitted to pass through the arbitration process via the intervention logic 40; (3) ensuring that the TCM 20 of FIG. 1 cannot command an axle torque resulting in a threshold acceleration event, e.g., a 0.2-0.3 G acceleration of the vehicle 10 in 0.2-0.3 milliseconds, either during initial motion or during steady state operation; and (4) limiting the maximum achievable vehicle speed $N_{10}$ while the vehicle 10 is in creep mode, as shown in FIG. 4. Each of these functions will now be explained in turn.

Rationalization of Controller Arbitration Decision

The intervention logic 40 of FIG. 2, via the control nodes A, B, and C, independently determines when the creep control module 20A should be the dominant controller among the various control modules 20X. In that event, the TCM 20, via execution of the intervention logic 40, prevents the other control modules 20X from prevailing in the overall torque arbitration decision.

A set of vehicle conditions is first evaluated by the TCM 20 to determine whether the vehicle 10 of FIG. 1 is actively launching. An example set of conditions may include that braking levels (arrow Bx of FIG. 1) are above a calibrated braking threshold, e.g., $B_X$>20% travel or apply force, and that vehicle speed $N_{10}$ is less than a calibrated speed threshold, for instance less than about 7 KPH. Additional vehicle conditions may include a throttle request (arrow Th % of FIG. 1) of less than a calibrated throttle level, e.g., Th %<3% max travel or apply force, that the vehicle 10 is in $1^{st}$ or $2^{nd}$ gear, a gear shift is not in progress, and the engine 12 of FIG. 1 is running.

If the above listed conditions are all true, the intervention logic 40 determines that the vehicle 10 of FIG. 1 cannot be launching, regardless of the output of the launch control module 20D. The TCM 20 sets the launch torque ($T_L$) is set to zero at node A. Thereafter, node A may rate limit the launch torque ($T_L$) whenever throttle request (arrow Th %) again increases, a step which may help to prevent any of the other control modules 20X of FIG. 2 from producing an unfavorable rise in clutch torque.

Brakes Applied at a Stop

The intervention logic 40 shown in FIG. 2 also ensures that when the brake pedal 11B of FIG. 1 is applied at or above zero throttle request (arrow Th %), the creep torque ($T_{CR}$) from the creep control module 20A equals zero. This functionality may be aided via the example lookup table 50 shown in FIG. 3.

Referring briefly to FIG. 3, the lookup table 50 may be indexed in part by brake pedal position ($B_X$) as shown, with a value of 0 in the column "Bx" representing 0% apply/fully released and a value of 100 representing 100% apply or fully applied, and by vehicle speed ($N_{10}$) (top row) in KPH. The lower right corner of FIG. 3 shows a control zone 52 in which creep torque is fully suppressed, i.e., set to zero. Here, the controller used to execute the intervention logic 40, e.g., the TCM 20 of FIG. 1, fully suppresses the creep torque to zero when the brake pedal 11B is applied above 40% travel and vehicle speed is below 0.1 KPH, with this being one possible example embodiment.

The output of table 50 is a maximum allowable torque gain of between 0 and 1, which ultimately limits the vehicle speed ($N_{10}$). The gain is multiplied by the prescribed creep torque ($T_{CR}$) and passed at node B of FIG. 2. Using the table 50 of FIG. 3, when the creep controller 20A of FIG. 2 is determined to be the proper dominant controller, as determined by the intervention logic 40, no other torque commands pass node B in FIG. 2.

Preventing Threshold Accelerations

Returning to FIG. 2, the intervention logic 40 also does not allow the creep control module 20A to generate an axle torque resulting in a threshold acceleration event, e.g., 0.3 G in 0.3 ms, either during initial vehicle motion or during steady state operation. Rate limiting may be implemented at node C as shown on the creep torque ($T_{CR}$), with active rate limiting indicated by a binary variable. The rate-limited creep torque then passes through the arbitration process, where each MAX block performs a maximum comparison of the inputs.

Limiting Maximum Vehicle Speed

Figure 5:
FIG. 5 is a table describing vehicle speeds and clutch gains that may also be usable with the torque arbitration logic of FIG. 2.

Additionally, the intervention logic 40 of FIG. 2 limits the maximum achievable vehicle speed $N_{10}$ whenever creep is active, i.e., when there are negligible braking levels, and also provides torque reduction if the driver is actively braking A table 70 is shown in FIG. 5, with the table 70 indexed by both vehicle speed ($N_{10}$) and clutch gain (K), with speed ($N_{10}$) shown KPH and the gain (K) being unitless. The gain (K) on the clutch torque is multiplied by the creep torque ($T_{CR}$), and then applied at node B in the torque arbitration strategy. The result is a vehicle speed ($N_{10}$) that is limited to no more than that which is possible given the allowable clutch torque. Block T? MAX in FIG. 2 refers to the status of the bit flag from control module 20F. If the differential is active, i.e., equal to 1, all values shown in FIG. 2 that reach the summation node (Σ) are summed.

The output of the summation node is the torque command ($T_{CC}$) that is passed to the input clutch C1 or C2 after being converted to position control signals, e.g., via reference to a calibrated torque-to-position (TTP) lookup table. As is known in the art, the high pressures used to actuate the input clutches of a DCT or AMT typically require closed-loop position control of the clutches as opposed to pressure control. Thus, TTP lookup tables are commonly used to translate a torque command, which specifies the required torque capacity for the input clutch, and the corresponding position of the clutch piston used to actuate the input clutch, e.g., clutches C1 or C2 of FIG. 1.

Referring to FIG. 4, a pair of time plots 60A and 60B show the limiting effect of the control steps at control node B of FIG. 2 as described above, with magnitude (M) plotted on the shared vertical axis and time (t) plotted on the two horizontal axes. At $t_1$, the driver removes all pressure from the brake pedal 11B of FIG. 1 and the vehicle 10 begins to creep. Time plot 60A shows the increasing vehicle speed $N_{10}$ beginning shortly after this at $t_1$. Absent control node B as shown in FIG. 2, the vehicle speed $N_{10}$ may continue to rise to the level indicated by trace N* in some circumstances. The imposition of node B in the overall torque arbitration process thus ensures that vehicle speed $N_{10}$ is selectively limited during the creep maneuver to a lower level, $N_{LIM}$. This can occur via application of table 70 of FIG. 5, which effectively limits the clutch torque or torque capacity of the input clutch C1 or C2, whichever is used for creep control and launch.

Time plot 60B shows the changing clutch torque ($T_C$), which again is the value used to modulate the creep torque. In other words, a calibrated amount of clutch torque can be applied to generate a desired amount of creep torque. While this is done manually in a manual transmission via depression of the clutch pedal, modulation of clutch torque is performed automatically in a DCT or AMT.

When braking is active, the clutch torque ($T_C$) may be selectively rate-limited. In other words, the local slopes (m) in FIG. 4 can be limited, which in turn regulates the acceleration of the vehicle 10. In FIG. 2, the rate-limited torque that is passed through node B is thus summed with the differential score torque ($T_{DS}$), when that torque is active, and also summed with the deglaze torque ($T_{DS}$), at a summation node (Σ). The result passes as the commanded torque ($T_{CC}$), which is ultimately used to control the clutch torque of the transmission 14 of FIG. 1.

Use of the intervention logic 40 of FIG. 2 as described above fully integrates monitoring logic with a torque arbitration strategy in a DCT or an AMT, which ensures proper/expected clutch control commands during a creep operation. Use of the present invention helps prevent torque application while the vehicle 10 is stopped with the brake pedal 11B applied, as well as limit excess creep speed and prevent threshold acceleration events during the creep operation.

The detailed description and the drawings or figures are supportive and descriptive of the invention, but the scope of the invention is defined solely by the claims. While the best mode, if known, and other embodiments for carrying out the claimed invention have been described in detail, various alternative designs and embodiments exist for practicing the invention defined in the appended claims.

The invention claimed is:

1. A vehicle comprising:
   a brake pedal;
   an engine having a crankshaft;
   a transmission having an input member and an input clutch responsive to position control signals, wherein engagement of the input clutch connects the crankshaft to the input member;
   a controller having multiple control modules, each of which outputs a corresponding torque command, wherein the multiple control modules include a creep controller programmed to output a calibrated creep torque, and wherein the controller includes a processor and tangible, non-transitory memory on which is recorded intervention logic, the execution of which causes the controller to independently monitor the corresponding torque commands from each of the multiple control modules during a creep maneuver, and to execute a set of control actions when predetermined conditions are present, including:
  allowing only the torque command from the creep controller to determine the position control signals of the input clutch during the creep maneuver; and
  setting the creep torque to zero when the brake pedal is applied.

2. The vehicle of claim 1, wherein the multiple control modules include a launch control module operable to output a launch torque, and wherein the set of control actions includes limiting a rate of increase in the launch torque when exiting from the creep maneuver.

3. The vehicle of claim 2, wherein limiting the rate of increase in the launch torque is sufficient to limit an acceleration of the vehicle to less than 0.3 G in 0.3 ms.

4. The vehicle of claim 2, wherein the set of control actions includes limiting a maximum speed of the vehicle via application of a clutch gain to the creep torque while in the creep maneuver.

5. The vehicle of claim 4, wherein the controller, as part of the set of control actions, applies a clutch gain of 0 when the vehicle speed reaches 7 KPH.

6. The vehicle of claim 1, further comprising an accelerator pedal, wherein the controller is programmed to determine if the vehicle is actively launching by comparing braking levels from the brake pedal, vehicle speed, and throttle request from the accelerator pedal to corresponding thresholds as the predetermined conditions.

7. The vehicle of claim 1, wherein the controller sets the creep torque to zero when the brake pedal is applied above about 40% travel and the vehicle speed is below 0.1 KPH.

8. A transmission assembly for use with a vehicle having an engine, the transmission assembly comprising:
  an input member;
  an input clutch responsive to position control signals, wherein engagement of the input clutch connects a crankshaft of the engine to the input member; and
  a controller in communication with a brake pedal and having multiple control modules, each of which outputs a corresponding torque command, wherein the multiple control modules include a creep controller programmed to output a calibrated creep torque, and wherein the controller includes a processor and tangible, non-transitory memory on which is recorded intervention logic, the execution of which causes the controller to independently monitor the corresponding torque commands from each of the multiple control modules during a creep maneuver, and to execute a set of control actions when predetermined conditions are present, including:
    allowing only the torque command from the creep controller to determine the position control signals of the input clutch during the creep maneuver; and
    setting the creep torque to zero when the brake pedal is applied.

9. The transmission assembly of claim 8, wherein the multiple control modules include a launch control module operable to output a launch torque, and wherein the set of control actions also includes limiting a rate of increase in the launch torque when exiting from the creep maneuver.

10. The transmission assembly of claim 9, wherein limiting a rate of increase in the launch torque is sufficient to limit an acceleration of the vehicle to less than 0.3 G in 0.3 ms.

11. The transmission assembly of claim 8, wherein the set of control actions includes limiting a maximum speed of the vehicle via application of a clutch gain to the creep torque while in the creep maneuver.

12. The transmission assembly of claim 11, wherein the controller, as part of the set of control actions, applies the clutch gain with a value of 0 when the speed of the vehicle reaches 7 KPH.

13. The transmission assembly of claim 8, wherein the vehicle includes an accelerator pedal, and wherein the controller is programmed to determine if the vehicle is actively launching by comparing braking levels from the brake pedal, a speed of the vehicle, and a throttle request from the accelerator pedal to corresponding thresholds as the predetermined conditions.

14. The transmission assembly of claim 8, wherein the controller sets the creep torque to zero when the brake pedal is applied above about 40% travel and a speed of the vehicle is below 0.1 KPH.

15. A method of independently monitoring, during a creep maneuver of a vehicle, torque commands from each of a plurality of control modules of a controller, wherein the vehicle includes a brake pedal and an input clutch, the method comprising:
  outputting a corresponding torque command from each of the control modules, including outputting a calibrated creep torque from a creep control module;
  monitoring the corresponding torque commands from each of the multiple control modules during the creep maneuver; and
  executing a set of control actions via the controller when predetermined conditions are present, including allowing only the torque command from the creep controller to determine a position control signal of the input clutch during the creep maneuver, and setting the creep torque to zero when the brake pedal is applied.

16. The method of claim 15, wherein the control modules include a launch control module, the method further comprising:
  outputting a launch torque via the launch control module; and
  limiting, as one of the control actions, a rate of increase in the launch torque when exiting from the creep maneuver.

17. The method of claim 16, wherein limiting a rate of increase in the launch torque includes limiting an acceleration of the vehicle to less than 0.3 G in 0.3 ms.

18. The method of claim 16, further comprising: limiting, as one of the control actions, a maximum speed of the vehicle via application of a clutch gain to the creep torque while in the creep maneuver.

19. The method of claim 16, further comprising: determining if the vehicle is actively launching by comparing braking levels, vehicle speed, and a throttle request from an accelerator pedal to corresponding thresholds as the predetermined conditions.

20. The method of claim 16, further comprising: setting the creep torque to zero when the brake pedal is applied above about 40% travel and vehicle speed is below 0.1 KPH.

* * * * *